United States Patent [19]

Kus

[11] 3,954,622
[45] May 4, 1976

[54] SEALING MEANS FOR DIVIDER STRIPS ON FILTER DRUMS

[75] Inventor: Ernest Ryszard Kus, Norwalk, Conn.

[73] Assignee: Dorr-Oliver Incorporated, Stamford, Conn.

[22] Filed: Sept. 23, 1974

[21] Appl. No.: 508,266

Related U.S. Application Data

[63] Continuation of Ser. No. 364,628, May 29, 1973, abandoned.

[52] U.S. Cl. ............................ 210/404; 29/163.5 F
[51] Int. Cl.² .......................................... B01D 33/08
[58] Field of Search ........... 210/400, 401, 402, 403, 210/404; 29/163.5 F

[56] References Cited
UNITED STATES PATENTS

| | | | |
|---|---|---|---|
| 1,468,875 | 9/1923 | Clarke | 210/402 X |
| 2,134,703 | 11/1938 | Cobb | 210/402 |
| 2,259,235 | 10/1941 | Weiss | 210/402 |
| 2,263,189 | 11/1941 | Peterson | 210/402 |
| 2,534,161 | 12/1950 | Collins | 210/402 X |

OTHER PUBLICATIONS

Product Design Catalog Tile (3) Jan. 28, 1960, Dow Corning, 3cl/DW – "Silicones", The Dodge Corp., 119 W. 40th St., N.Y., N.Y.

Primary Examiner—Theodore A. Granger
Attorney, Agent, or Firm—Burtsell J. Kearns; Theodore M. Jablon

[57] ABSTRACT

Filter drum for continuous drum filter featuring longitudinal divider strips or channel members spot welded to the drum cylinder, with caulking material provided underneath the channel member along the length thereof, against leakage between mutually adjoining filtrate chambers.

4 Claims, 9 Drawing Figures

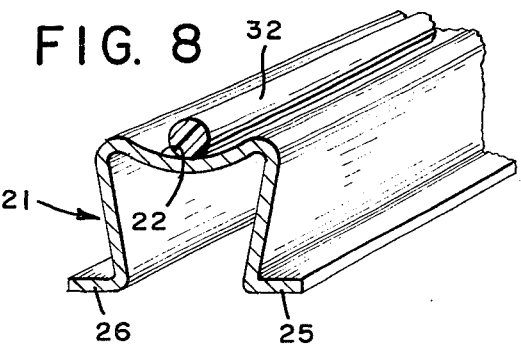
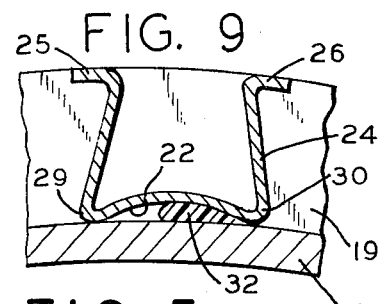
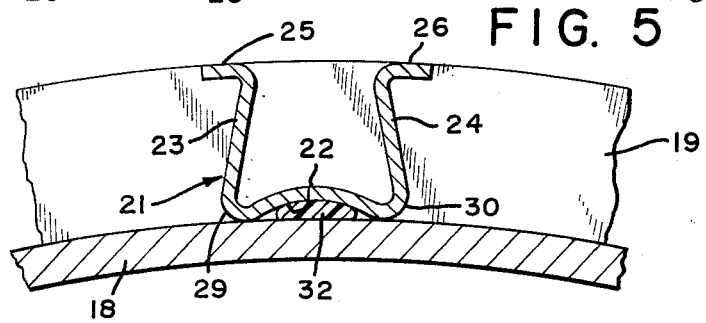
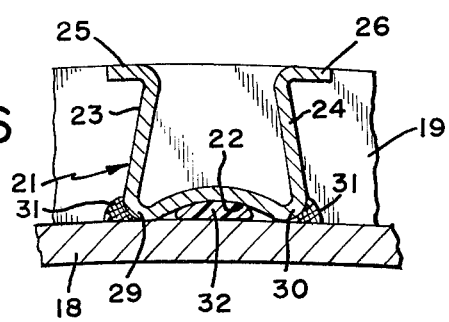
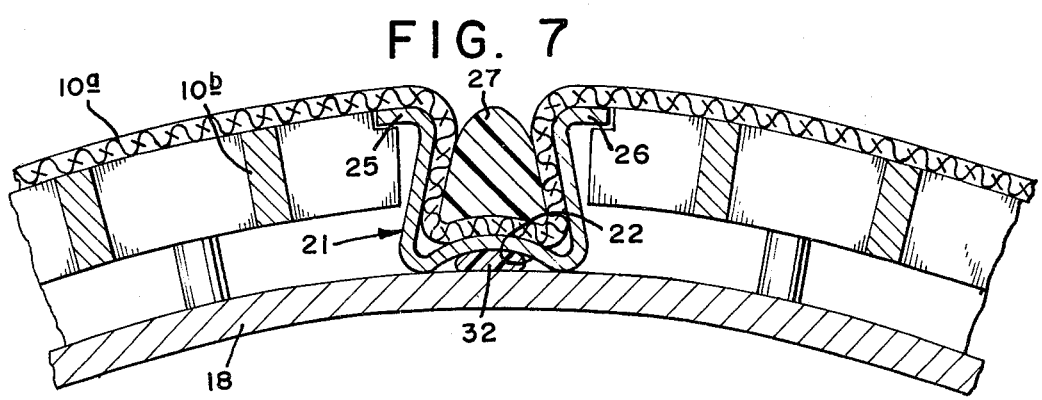
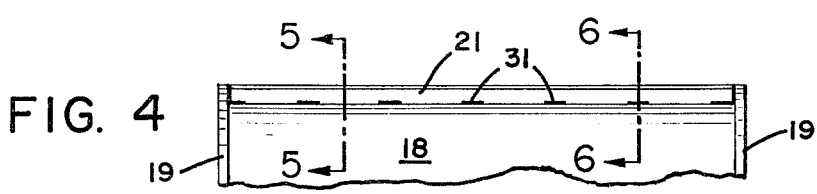

SEALING MEANS FOR DIVIDER STRIPS ON FILTER DRUMS

This is a continuation of application Ser. No. 364,628 filed May 29, 1973, now abandoned.

This invention relates to rotary drum filters capable of delivering a filter cake in continuous operation.

While the invention is applicable to drum filters which deliver the filter cake by way of an endless filter belt, looped around the drum, in the present example the invention is shown embodied in the type of filter unit that delivers the filter cake directly from the drum.

More in particular, the invention is concerned with the construction of the filter drum which is mounted for rotation upon the end walls of a filter vat containing the pulp continuously supplied thereto, to undergo filtration.

The filter drum comprises the bare drum cylinder with end trunnions mounted in support bearings on the vat, rotatable by suitable drive mechanism. Upon this drum cylinder are fixed the so-called divider strips evenly spaced about the periphery of the drum, parallel to the drum axis, and between them defining the filtration chambers. A rim or annular shoulder surrounding each end of the drum cylinder provides the end closures for the filtration chambers.

Conventionally, the divider strips are in the form of a channel member of U-shaped profile having a concavely shaped bottom portion, and slightly converging upstanding sides each of which terminates in an outwardly overhanging flange. The bottom portion, because of its concavity, forms with the cylinder a shallow empty space along the length of the channel member endwise confined between the aforementioned rims.

Conventional drainage grid panels occupy the spaces between the divider strips or channel members, shaped to support the filter cloth that is sealingly and securely tucked into the channel members. Hoops of suitable tough strip material are tightened around the end rims of the cylinder, so as to sealingly secure the lateral edges of the filter cloth. Thus, each of the individual filtration chambers may be subjected to vacuum through internal piping leading to the conventional trunnion valve that controls the filtration cycle.

In the filtration cycle of the present embodiment, as the filter drum is rotated partially immersed in the pulp, vacuum is applied, allowing filter cake to form on the filtration chambers while in full submergence, and filtrate liquid to be delivered through the trunnion valve. Vacuum is continued as the filter cake on the drum emerges from the bath of pulp, and while passing through a spray washing stage at the ascending side, and further during the drying phase at the descending side of the drum, where residual liquid is drawn from the filter cake and from the filtration chambers.

Vacuum is then broken as by back pressure or by atmospheric pressure effected by the trunnion valve in a cake discharge zone at the descending side, before re-submergence of the denuded filter cloth in the pulp.

Because of pressure differentials developing between mutually adjoining filtration chambers in the operation of the filtration cycle, and to prevent leakage from one filtration chamber to the next, conventional practice heretofore required to have an uninterrupted welding seam provided along at least one side of each divider strip fixing the same to the drum cylinder. Suitable weld connections would seal off the ends of the channel members against the respective adjoining rims.

It is the main object of this invention to eliminate the high cost of the uninterrupted welding seams along the length of the divider channel members, a cost that assumes significant proportions for example where the filter drum may have a length of 20 feet or more, and a correspondingly large diameter.

According to this invention, this welding cost is practically eliminated by applying only widely spaced spot welds along either side of the channel member, but with sealing means interposed to fill the aforementioned bottom concavity underneath the channel member from one end thereof to the other.

Preferably, the sealing means is in the nature of a yieldable or plastically deformable material that will be forced or wedged sealingly into one side edge portion of the bottom concavity of the divider strip, when subjected to the aforementioned pressure differential between mutually adjoining filter chambers. In this way, the pressure differential itself may be utilized to insure the formation of a positive and perfect seal.

Specific features lie in the provision of a divider channel profile, and of a caulking material, particularly suited for the purposes of this invention.

Other features and advantages will hereinafter appear.

In the Drawings:

FIG. 4 is a fragmentary longitudinal sectional view taken on line 4—4 in FIG. 1, showing a side view of one of the divider channel members.

FIG. 5 is an enlarged cross-sectional view taken on line 5—5 in FIG. 4, between spot welds.

FIG. 6 is a similar cross-sectional view taken on line 6—6 in FIG. 4, across spot welds.

FIG. 7 is a cross-sectional fragmentary view similar to FIG. 5, but with filter cloth and supporting grids in place.

FIG. 8 illustrates the application of the caulking material to the divider strips.

FIG. 9 is a view similar to FIG. 5, illustrating the sealing effect upon the caulking material due to pressure differential.

Figure 1:
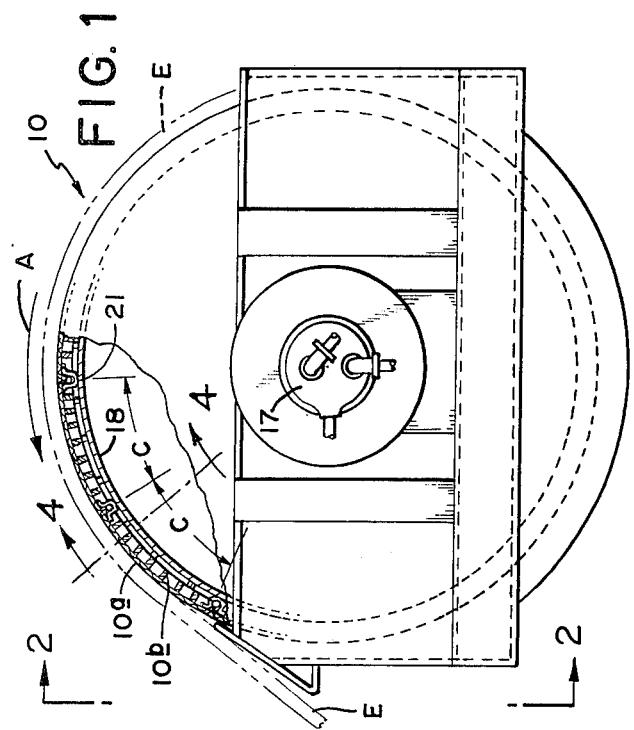
FIG. 1 is a semi-diagrammatic end view of a drum filter unit adapted to embody the invention, with parts broken away.
Figure 2:
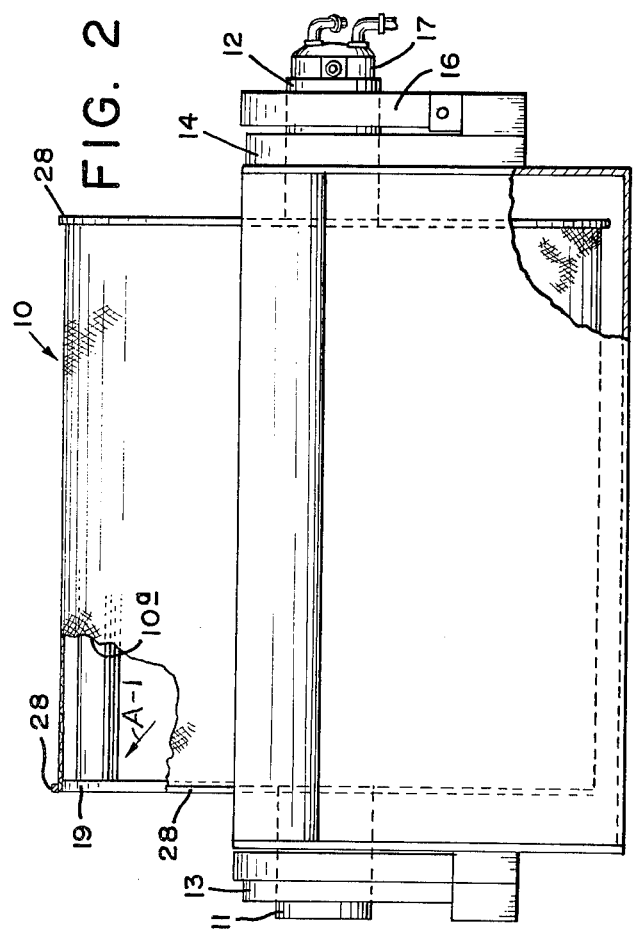
FIG. 2 is a side view of the filter unit taken on line 2—2 in FIG. 2, with parts broken away.
Figure 3:
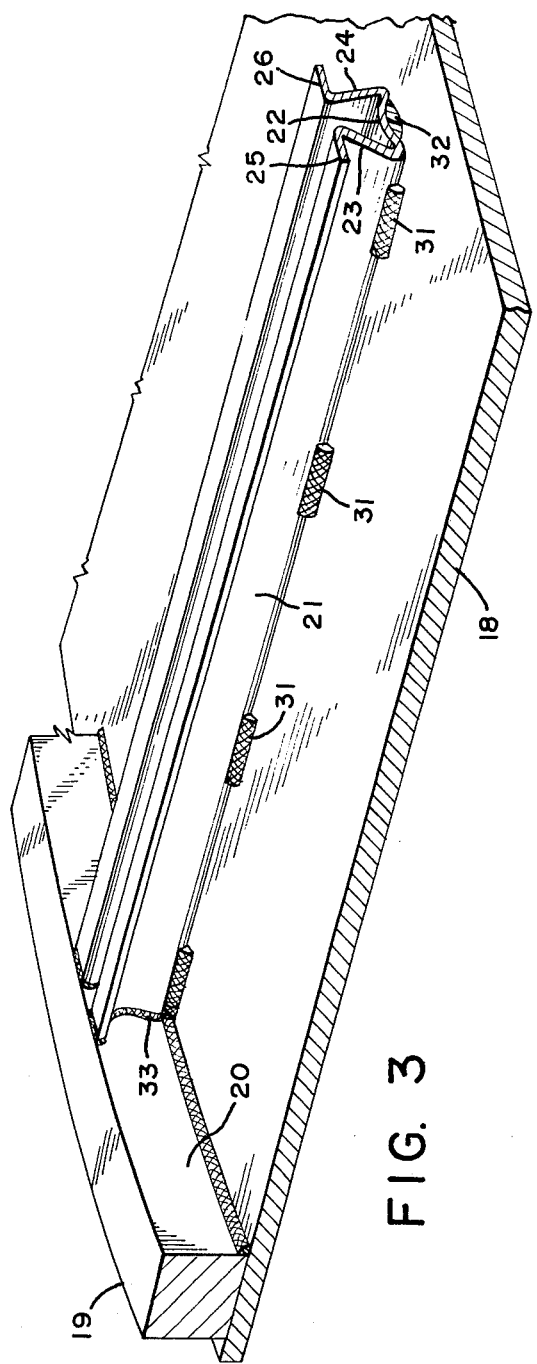
FIG. 3 is a fragmentary perspective view of an interior corner portion of one of the filtration chambers, as viewed in the direction of arrow shown in FIG. 2, illustrating the invention relative to the divider strips or channel members.

As herein shown by way of example, the invention may be embodied in the drum filter unit semidiagrammatically shown in FIGS. 1 and 2.

In this filter unit, a filter drum 10 is subdivided peripherally into longitudinal filtration chambers "C" each of which is covered tightly by a filter cloth 10a supported by a grid 10b. This filter drum has trunnions 11 and 12 supporting the drum for rotation in respective bearings 13 and 14 mounted upon the end walls of a filter vat containing the pulp to be subjected to filtration. One of these end walls also carries the drive mechanism 16 for rotating the filter drum in the direction of arrow "A".

A trunnion valve 17 with internal pipe connections (not shown) to each of the filtration chambers, controls the filtration cycle incident to the rotation of the drum. Briefly, in this cycle, filter cake is formed by vacuum on the lower drum portion submerged in the pulp. The emerging cake "E" indicated in dot-and-dash is then carried, under continued vacuum, from the ascending side to the descending side of the drum, and is then detached by well known means from the filter cloth in a cake discharge zone, after the vacuum is broken, whereupon the filtration cycle may repeat itself.

The filter drum itself embodying the invention, will now be described, more particularly by reference to FIGS. 3 to 9.

Accordingly, a drum cylinder 18 herein briefly termed the drum, is supported by the trunnions 11 and 12 for rotation in bearings 13 and 14 respectively. Each end of the drum has a rim 19 consisting of square profile stock sealingly welded to the periphery of the drum. Each of these rims presents an inwardly facing annular shoulder face 20 extending in a plane transversal of the drum axis.

Endwise confined between the shoulder faces 20 of the rims are the so-called divider strips 21 provided in the form of channel members of U-shaped profile. This profile has a shallow hollowed bottom portion or bottom concavity 22, and slightly converging sides 23 and 24 terminating in outwardly overhanging flanges 25 and 26 respectively.

These channel shaped divider strips extending parallel to the drum axis, are evenly spaced substantial distances apart, so as to constitute between them, and between the two rims, the shallow filtration chambers or compartments "C".

Normally, a drainage grid 10b (see FIGS. 1 and 7) shaped to the curvature of the drum, is removably fitted into each of the filtration chambers, adapted to support the filter media or filter cloth 10a applied over the filtration chambers in a manner conventionally known.

Accordingly, the filter cloth is stretched over the grid members, and tucked or wedged sealingly into the channel members as by means of a tightly fitted locking strip of resiliently deformable material or a suitable caulking material 27 retained between the converging sides of the divider strips. The complementary side edges of the filter cloth are sealingly secured upon the respective rims 19, usually by means of tough metal bands or hoops 28 (see FIG. 2) tightly surrounding the respective rims.

The invention being directed more particularly to securing the divider strips or channel members upon the drum in a manner to provide a leak-proof connection, is illustrated in FIGS. 3 to 9.

Accordingly, the two bottom edge portions 29 and 30 of the channel members are fixed to the drum cylinder by means of spot welds 31 on either side of the channel members, widely spaced from one another, so as to minimize or nearly eliminate the welding costs as compared with the prior practice of performing continuous leak-proof welding seams along the entire length of the channel members.

According to the invention, this pattern of bilaterally applied spot welds 31 is combined with the provision of a caulking strip 32 contained in or filling the shallow empty space due to the bottom concavity between the channel members and the drum cylinder, from end to end.

In the process of manufacture, as indicated in FIG. 8, a divider strip or channel member is first placed upside down upon a supporting surface, whereupon a strip or strand 32 of caulking material is applied to the channel bottom from end to end. The strip of caulking material will adhere to the bottom of the channel member, when being placed in the FIG. 5 position upon the drum. Pressing the channel member down into position upon the drum will flatten the caulking strip to the extent of substantially filling out the concavity. The spot welds 31 are then applied to fix the channel member in position.

Leak-proof short welding seams 33 (see FIG. 3) are applied between the ends of the channel members and the abutting rims.

It will be understood that the spot welds 31 at one side may be staggered relative to the spot welds at the other side.

In a practical embodiment, a suitable sealing material applicable for the purposes of this invention is a caulking compound known as "Silastic 732 RTV" made by Dow Corning, Midland, Mich.

This material when applied as by extrusion from a tube container, is of a pasty consistency, but will solidify moderately into a pliable or semi-soft elastomer.

As illustrated in FIG. 9, the differential pressure between mutually adjoining filter chambers will cause this caulking material to be compacted into the side edge portion of the concavity adjacent to the low pressure- or vacuum side of the divider strip. This self-sealing wedging action will result in providing a tight and positive sealing effect.

I claim:

1. In a rotary vacuum drum filter provided with filtration chambers adjoining one another about the periphery of a drum cylinder, whereby filter cake is formed and held upon the filter media on said filtration chambers except where the vacuum is broken in a filter cake discharge zone at the descending side of the drum, the combination which comprises said drum cylinder provided with end trunnions, and with a rim surrounding each end of the cylinder in sealed relationship therewith, a plurality of divider strips in the form of channel members extending parallel to the cylinder axis, endwise between said rims in sealing relationship therewith, said channel members being spaced from one another to constitute said filtration chambers between them and between said rims, said channel members being of U-shaped sheet metal profile having an arched bottom face of a concavity facing the drum cylinder surface, said channel member thus having longitudinal bottom edge portions supported on said cylinder surface, and constituting with the drum cylinder surface a longitudinal duct of a cross-sectional area defined by the concavity of said arched bottom face of the channel member and by the drum surface, said arched bottom face thus forming with the drum cylinder surface a pair of oppositely directed nips internally along each bottom edge portion of the channel member, a strand of plastically deformable sealing substance contained in said shallow duct along the length thereof, and deformed so as to sealingly occupy said duct, and weld connections provided between the drum cylinder surface and said bottom edge portions of the channel member, said weld connections being spaced apart along said longitudinal bottom edges, whereby the channel member is fixed to the drum surface, and whereby the pressure differential occurring between any two mutually adjoining filtration chambers passing through said filter cake discharge zone, is adapted to wedgingly force said deformable sealing substance into tight sealing relationship with the nip extending along the respective bottom edges of said channel members.

2. The combination according to claim 1, wherein said weld connections comprise spot welds spaced apart along said longitudinal bottom edges of the channel member.

3. In the manufacture of a rotary filter drum adapted for vacuum filtration, having a drum cylinder provided with end trunnions and with a rim surrounding each end of the cylinder in sealed relationship therewith, and with longitudinal divider strips on said drum cylinder constituting with said rims a compartmentation defining filtration chambers adjoining one another about the periphery of the drum cylinder, said filter drum being adapted during continuous vacuum filtration to have filter cake formed and held upon the filter media on said filtration chambers except where the vacuum is broken in a filter cake discharge zone at the descending side of the filter drum, the method of sealingly fastening said divider strips to said drum cylinder, which comprises
  a. providing a divider strip in the form of a channel member of sheet metal profile having the length of the distance between the two rims, said profile having a bottom of shallow concavity, a pair of slightly coverging side wall faces, and a pair of longitudinal bottom edge portions,
  b. placing and holding said channel member upon the drum surface so as to extend thereon along a predetermined line parallel to the drum axis and along the distance between said rims, with a strand of plastically deformable sealing substance interposed in said shallow concavity along the length of the channel member, and thus confined in the shallow duct formed by said concavity and the drum surface, said shallow concavity thus forming with the drum surface a pair of opposedly directed nips internally along said bottom edge portions of the channel member,
  c. and applying weld connections spaced apart along the longitudinal bottom edge portions of the channel member, thereby fixedly connecting said edge portions and thus the channel member to the drum cylinder surface along said predetermined line, while allowing the pressure differential between any two mutually adjoining filtration chambers passing through said filter cake discharge zone to wedgingly force said deformable substance sealingly into the nip extending along the respective side of said shallow duct.

4. The method according to claim 3 which comprises,
placing said channel member bottom side up upon a supporting surface,
applying a strand of plastically deformable sealing substance to said bottom concavity along the length thereof, said substance being adapted to adhesively stay in place along said concavity when the divider strip is turned to its upright position,
placing said strand of sealing material adhering thereto upright upon the drum cylinder parallel to the cylinder axis and along said predetermined line and holding said channel member in said position,
and while thus maintaining said channel member in place, fixing the same to the drum cylinder by applying weld connections spaced apart along the longitudinal bottom edge portions of the channel member.

* * * * *